US009875845B2

(12) United States Patent  
Poehmerer (10) Patent No.: US 9,875,845 B2  
(45) Date of Patent: Jan. 23, 2018

(54) COUPLING DEVICE AND COUPLING ASSEMBLY FOR THE CONTACT-FREE TRANSMISSION OF DATA SIGNALS AND METHOD FOR THE TRANSMISSION OF DATA SIGNALS

(71) Applicant: LEONI KABEL HOLDING GMBH, Nuremberg (DE)

(72) Inventor: Rainer Poehmerer, Winkelhaid (DE)

(73) Assignee: LEONI Kabel Holding GmbH, Nuremberg (DE)

( * ) Notice: Subject to any disclaimer, the term of this patent is extended or adjusted under 35 U.S.C. 154(b) by 51 days.

(21) Appl. No.: 14/978,042

(22) Filed: Dec. 22, 2015

(65) Prior Publication Data

US 2016/0181012 A1   Jun. 23, 2016

(30) Foreign Application Priority Data

Dec. 22, 2014  (DE) .................. 10 2014 226 888

(51) Int. Cl.
  *H01P 5/02*      (2006.01)
  *H01F 38/14*     (2006.01)
  (Continued)

(52) U.S. Cl.
  CPC .......... *H01F 38/14* (2013.01); *H04B 5/0031* (2013.01); *H01F 2038/143* (2013.01); *H01F 2038/146* (2013.01)

(58) Field of Classification Search
  CPC . H01P 3/06; H01P 5/02; H01B 11/002; H01B 11/18
  (Continued)

(56) References Cited

U.S. PATENT DOCUMENTS 4,887,069 A * 12/1989 Maki .................. G08B 13/2497  
                                                            333/237  
5,247,270 A *  9/1993 Harman ............... H01Q 13/203  
                                                            174/36  
(Continued)

FOREIGN PATENT DOCUMENTS

DE        10328881 B3    1/2005  
DE        60128730 T2    1/2008  
  (Continued)

*Primary Examiner* — Dean Takaoka  
(74) *Attorney, Agent, or Firm* — Laurence A. Greenberg; Werner H. Stemer; Ralph E. Locher (57) ABSTRACT

A coupling device serves for the contact-free transmission of data signals between signal conductors of two signal lines with the aid of a coupling structure. At least one signal conductor is a signal core of a signal cable. Coupling portions of the two signal conductors are positioned parallel in relation to one another in a defined way with the aid of the coupling structure. At least a first signal conductor preferably being free from galvanically connected coupling elements lies in a coupling aid. The contact-free coupling dispenses with connecting additional coupling elements at the ends to a signal cable in an electrically conducting manner. By obviating the need for special connector fabrication, this achieves the effect of simplifying assembly and at the same time also improving data transmission reliability, since faults that occur for example in a crimping or soldering process are ruled out.

18 Claims, 9 Drawing Sheets

(51) Int. Cl.
*H04B 5/00* (2006.01)
*H01P 3/06* (2006.01)

(58) Field of Classification Search
USPC .................................... 333/237, 24 R, 24 C
See application file for complete search history.

(56) References Cited

U.S. PATENT DOCUMENTS

| | | | | |
|---|---|---|---|---|
| 5,404,117 A * | 4/1995 | Walz | ................ | H01P 5/085 |
| | | | | 333/260 |
| 5,483,020 A * | 1/1996 | Hardie | ................ | H01B 11/203 |
| | | | | 156/51 |
| 6,717,493 B2 * | 4/2004 | Chopra | ................ | H01P 11/005 |
| | | | | 333/237 |
| 6,882,239 B2 | 4/2005 | Miller | | |
| 6,917,253 B2 * | 7/2005 | Rumold | ................ | H01P 1/047 |
| | | | | 333/24 C |
| 6,955,564 B2 * | 10/2005 | Cho | ................ | H01R 9/0515 |
| | | | | 439/581 |
| 7,019,984 B2 * | 3/2006 | Driscoll | ................ | H01R 24/50 |
| | | | | 361/788 |
| 7,466,794 B2 | 12/2008 | Krumme | | |
| 7,545,243 B2 * | 6/2009 | Serban | ................ | H01P 1/2007 |
| | | | | 333/260 |
| 7,777,588 B2 * | 8/2010 | Gleich | ................ | G01R 33/287 |
| | | | | 333/24 R |
| 8,319,574 B2 * | 11/2012 | Lee | ................ | H01P 3/088 |
| | | | | 333/116 |
| 8,440,910 B2 * | 5/2013 | Nonen | ................ | H01B 11/203 |
| | | | | 174/113 R |
| 8,546,691 B2 * | 10/2013 | Watanabe | ........... | H01B 11/1834 |
| | | | | 174/102 R |
| 8,643,372 B2 * | 2/2014 | Weiss | ................ | G01R 33/287 |
| | | | | 324/318 |
| 2009/0176450 A1 | 7/2009 | Chow et al. | | |
| 2012/0097421 A1 * | 4/2012 | Gundel | ................ | H01B 7/0861 |
| | | | | 174/113 R |

FOREIGN PATENT DOCUMENTS

| | | |
|---|---|---|
| DE | 102005063496 B4 | 7/2012 |
| WO | 2004054179 A1 | 6/2004 |

\* cited by examiner

COUPLING DEVICE AND COUPLING ASSEMBLY FOR THE CONTACT-FREE TRANSMISSION OF DATA SIGNALS AND METHOD FOR THE TRANSMISSION OF DATA SIGNALS

CROSS-REFERENCE TO RELATED APPLICATION

This application claims the priority, under 35 U.S.C. § 119, of German application DE 10 2014 226 888.5, filed Dec. 22, 2014; the prior application is herewith incorporated by reference in its entirety.

BACKGROUND OF THE INVENTION

Field of the Invention

The invention relates to a coupling device for the contact-free transmission of data signals. The invention also relates to a method for the transmission of data signals with the aid of such a coupling device.

Such a coupling device is disclosed by German Utility Model DE 601 28 730 T2. The known coupling device comprises a magnetic coupler, which is provided on a printed circuit board and inductively couples a signal into a transmission line. The signal line is for example a twisted pair or else a coaxial line and in particular is embedded in the printed circuit board.

A further coupling device is disclosed for example from German patent DE 103 28 881 B3. This coupling device is a device known as a contact-free RF connector, which is configured for the contactless transmission of data signals from a first signal line into a second signal line.

A contactless capacitive and/or inductive coupling of data signals into a signal conductor for contactless data transmission between two signal lines is also known for example from German patent DE 10 2005 063 496 B4, corresponding to U.S. Pat. No. 7,466,794. This discloses a wireless communication between two units of a computed tomography system arranged rotatably in relation to one another. U.S. patent publication No. 2009/0176450 A1 discloses the capacitive coupling between two microchips.

The contact-free RF connector described in German patent DE 103 28 881 B3 is formed in the manner of a plug-in connection, though—unlike in the case of conventional plug-in connectors—the plug-in elements inserted into one another do not touch. In a way similar to in the case of conventional plug-in connectors, here too conductor portions of the plug-in connector that are in the form of a pin or socket and are configured as coupling elements are galvanically connected to the respective signal cores of an electrical signal cable.

SUMMARY OF THE INVENTION

Against this background, the invention is based on the object of making an improved contactless data transmission possible between two signal lines with which reliable data transmission is made possible, along with lowest possible expenditure and low susceptibility to faults.

The object is achieved according to the invention by a coupling device with the features of the main apparatus claim. This is configured in principle for the contact-free transmission of data signals between two signal lines, that is to say from a first signal conductor of a first signal line into a second signal conductor of a second signal line, by making use of electromagnetic coupling principles that are known per se. At least one of the signal conductors is in this case a signal core of a signal cable. To make the contact-free transmission possible, the coupling device has a coupling structure, which is formed in such a way that the two signal conductors are positioned with sub portions, known as the coupling portions, in a defined way and preferably at a defined distance parallel to one another.

It is preferred in this case that at least one signal conductor, in particular the signal core, is free from galvanically connected coupling elements. Preferably, both signal conductors are free from such galvanically connected coupling elements. The coupling structure is therefore generally formed in such a way that portions of the respective signal conductors themselves, that is to say for example the cable ends, form the coupling portions, without additional coupling elements having to be galvanically connected to the signal cable.

In order to make this possible in an easy way, the coupling device also contains a coupling aid, in which the coupling portion of at least one of the signal cores, and in particular the coupling portion of the signal core of the signal cable, is accommodated. The signal core therefore merely needs to be inserted into the coupling aid. In this way it is guided to a defined position. Therefore, the coupling aid also provides a fixing means. At the same time, there is the possibility of assisting the desired electromagnetic coupling, and thereby ensuring reliable coupling, by a suitable choice of material and/or suitable geometry of the coupling aid.

This configuration is based on the one hand on the idea that, with an alignment of two elongate conductor portions, the electromagnetic effects automatically cause an inductive and/or a capacitive coupling, which is used for the signal transmission from the one signal conductor into the other signal conductor. On the other hand, this configuration is based on the crucial idea that customary connections, in particular plug-in connections, in which signal lines are connected to one another or else are connected to an electrical component, often involve a not inconsiderable fabrication effort to fasten a suitable connector component onto the signal line. This applies both to the conventional contact connectors and to the contact-free RF connector known from German patent DE 103 28 881 B3. In this fabrication, the respective contact elements or coupling elements have to be respectively connected to the individual signal cores of the signal line in an electrically conducting manner, that is to say galvanically. Moreover, such galvanically connected sockets or pins are susceptible to faults on account of the way in which they are necessarily mechanically designed. Moreover, the contacting regions between these contact elements or coupling elements and the respective signal cores are susceptible to faults, for example with regard to contact corrosion. Dispensing with such galvanically connected components for the signal cable therefore has the effect that the effort involved in production is much less and the susceptibility to faults is likewise lower. Therefore, in the present case, the signal core of the signal cable merely needs to be inserted into the coupling aid for a reliable coupling. It therefore lies in the coupling aid without a material-bonding connection and preferably also without mechanical clamping or fastening in the coupling aid. It therefore particularly lies loosely in the coupling aid. The signal core is therefore merely inserted into the free interior space of the coupling aid, without any kind of galvanic contacting being required. Stripping the insulation from the end of a core is not required in this case, and nor is it envisaged. The signal core therefore lies in the coupling aid with its core insulation.

The coupling structure is in this case preferably integrated in a housing, which is in particular part of a connector with which the two signal lines can be connected to one another, in particular reversibly. The housing is in this case subdivided in particular into two housing parts, the one signal line lying in the one housing part and the other signal line lying in the other housing part. The two housing parts are preferably designed to be reversibly joined together, the respective coupling portions of the signal conductors being brought exactly into the desired position in relation to one another during the joining together of the two housing parts. In particular, the at least one signal conductor of the signal cable is inserted into the coupling aid. Altogether, therefore, the entire coupling device is designed in the manner of a preferably reversibly separable connector.

As an alternative to this, the coupling portions of the signal lines are also jointly held inseparably in the housing, for example embedded.

In particular, the following various housing variants are provided:
a) Analogous to a conventional plug-in system, in which both sides have a housing part which can be reversibly connected to one another;
b) Only one side has a housing part, in which the one signal line lies. The other signal line or core is simply inserted into an opening, and possibly mechanically held inside;
c) Data cables or the cores thereof are inserted into openings from both sides onto a common coupler housing, and possibly mechanically held inside;
d) Two housing parts, which can be joined together, in particular clipped together, and have the receptacles for the positioning of the signal lines/cores during the joining together; and
e) The cable ends are brought into position and the holding structure is permanently formed by injection molding or the like.

Variants a)-d) are configured as reversibly separable or else irreversible.

In the case of shielded data lines, a coupling of the two shields also takes place, preferably automatically, during the coupling of the signal lines, optionally likewise contactlessly like the signal lines or galvanically.

Additionally, the introduction of a shielding that is to say an electrically conductive structure, into the housing is preferably envisaged.

The coupling device is for example a mechanical plastic component, in particular an injection-molded component, which brings the coupling portions into a defined position in relation to one another and holds them in this position. For this purpose, the component contains for example suitable fixing and holding means for the positioning of the coupling portions within the coupling device. With a two-part or multi-part design of the coupling device, as is the case with a plug-in connection, the desired positioning of the coupling portions takes place by the relative positioning of the individual parts of the coupling device in relation to one another.

In a preferred configuration, the coupling aid is configured for influencing the electromagnetic coupling, therefore assisting the coupling by its material and/or geometry.

In particular, for this purpose it is formed in an electrically conducting manner, preferably from metal. This achieves the effect of improved transmission characteristics, in particular an improved impedance profile.

In a preferred configuration, the coupling aid is in this case configured in the form of a socket or tube, and therefore surrounds the at least one signal conductor, in particular over the full circumference. The coupling aid in this case has an inside dimensioning, in particular an inside diameter, that is suitably dimensioned for receiving the signal conductor. With preference, the inside diameter is in this case adapted to the outside diameter of a signal core to be received, so that as far as possible the signal core lies with an exact fit in the coupling aid, apart from a necessary insertion gap.

A signal core is understood here as meaning an electrical conductor surrounded by an insulating sheath. In particular, a signal core is circular in cross section. Corresponding hereto, the coupling aid, or at least the receiving space in the form of a socket, is also considered to be circular in cross section.

The coupling aid is preferably configured in the manner of a sleeve or else in the manner of a helix, in which the respective coupling portion of the respective signal core is accommodated. A sleeve is understood in the present case as meaning a component with an uninterrupted wall, in particular a cylindrical wall. By contrast, in the case where it is configured as a helix, the coupling aid in the form of a socket is formed by a helically or spirally wound strand element.

For each pair of signal conductors to be coupled, precisely one coupling aid is preferably provided, into which the one signal conductor (signal core) is inserted. The other signal conductor is preferably galvanically connected to the coupling aid. Alternatively, the coupling takes place in particular completely without any galvanic connection to the coupling aid. For example, for each signal core there is formed a coupling aid, into which a respective signal core is inserted.

According to a preferred variant of an embodiment, the signal conductor of the one signal line is provided on a printed circuit board; in particular, it is a conductor track provided on the printed circuit board, for example printed on or produced in some other way. The coupling portion of the signal core of the signal cable is routed parallel to this conductor track. In the case of some electrical components, the data signals to be transmitted are provided on printed circuit boards with integrated electronics, the printed circuit boards usually being contacted by suitable plug-in connection systems. In the case of these configurations, therefore, a contact-free coupling with a signal cable is achieved by the coupling device.

The coupling aid is in this case preferably provided on the printed circuit board, in particular is fastened to it, to be precise preferably inseparably.

Furthermore, the coupling aid is preferably connected to the conductor track in an electrically conducting manner, in particular galvanically, preferably by soldering. That is to say that the coupling aid is a fixed component part of the printed circuit board.

In an expedient development, the coupling aid is in this case fastened on the printed circuit board while projecting beyond it at the end, and is consequently formed as it were as a coupling terminal, into which the signal core merely needs to be inserted. The coupling portion of the further signal line is therefore as it were achieved by the coupling aid and its electrical connection to the conductor track.

Expediently, the coupling portions running parallel to one another of the signal conductors corresponding to one another extend over at least several millimeters to several centimeters, preferably over less than 5 cm. as a result, on the one hand a reliable coupling is achieved and on the other hand an overall size of the coupling device that is as small as possible.

The coupling device is configured in particular for the connection of signal conductors over which radio-frequency data signals are transmitted. Radio frequency is understood here as meaning frequency ranges of at least several 10 MHz into the GHz range.

Expediently, at least one signal line is a multi-core signal cable with multiple signal conductors formed as signal cores. The signal cores are in this case kept spaced apart from one another by the coupling structure, preferably in a defined geometry, the signal conductors of the second signal line also being kept in the same geometry in a way corresponding thereto, so that the desired parallel alignment of the signal conductors in relation to one another is reliably achieved.

In this respect it is provided in a first variant of an embodiment that the relative assignment of the signal cores that they assume in the signal cable is changed by the coupling structure.

In particular, the coupling portions run at an angle, preferably perpendicularly in relation to a normal longitudinal direction of the cable.

According to a first variant of an embodiment, the signal cores are insulated signal cores of a conventional signal cable, which is provided with a cable sheath and is also referred to as a sheathed line. The insulated signal cores are led out from the cable sheath and bent around in the end region that is formed by the coupling portions. According to a first preferred configuration, they are for example arranged in relation to one another in the form of a star. In particular, they are twisted-together signal cores. With preference, what is known as a quad stranded lay-up is used.

Generally, data cables are preferably respectively used as components to be coupled. The respective data cable is optionally formed here as:
individual cores;
single-pair unshielded cables without a sheath;
single-pair unshielded cables with a sheath;
single-pair shielded cables without a sheath;
single-pair shielded cables with a sheath;
a quad stranded lay-up shielded with a sheath;
a quad stranded lay-up shielded without a sheath;
a quad stranded lay-up unshielded with a sheath;
a quad stranded lay-up unshielded without a sheath;
multi-pair cables comprising at least one of the quad stranded lay-ups of the aforementioned type;
multi-pair cables (comprising any combination (a) to (e), optionally with common shielding, optionally with a common sheath);
a flat line with flat-rolled conductors;
a flat line with round (solid or stranded) conductors;
a flat line such as (g) and (h) as a ribbon cable; and
coaxial cables.

As an alternative to the coupling portions of the signal cores extending in the form of a star, that is to say radially in different directions, they are for example laid along portions in the form of loops. Generally, this splaying of the signal cores subsequently in relation to the cable sheath has the effect that the distance between individual signal cores increases, so that the risk of them influencing one another is reduced.

In a preferred development—as an alternative to the sheathed line already mentioned—the signal cable is a flat cable, in particular an extruded flat cable, in which the individual signal cores are arranged parallel next to one another. The coupling device is used for example for coupling two such flat cables to one another or for connecting one such flat cable to an electrical component, or the coupling device is used for creating a transition from a conventional round signal cable to such an extruded flat cable. The flat cable is in this case preferably shielded or itself stranded for improved EMC shielding. These extruded flat cables typically take the form of a film-like cable with multiple signal cores arranged parallel to one another, typically containing flat-rolled individual wires, which are jointly surrounded by an extruded sheath of insulating material.

According to a preferred development, the signal cores are doubly insulated round cores. Therefore, two layers of insulation are laid around the metal core. As a result, the coupling effect is improved by increasing the capacitance.

The coupling device is generally used for connecting at least one signal core, preferably multiple signal cores of a signal cable contactlessly to a further signal line. This further signal line is optionally itself a signal line of the same type or of a different type or else is a signal line integrated in a device or component. The term "signal line" should be understood here in a broad sense and comprises any signal conductors that are suitable for data transmission.

Expediently, suitable filtering or damping elements are additionally already integrated in the coupling structure, so that a signal transmission that is as undisturbed as possible is made possible and, in particular, interference signals are filtered out. For example, such a filtering element in the manner of a standing wave trap known per se is already integrated in the coupling structure.

Depending on the form of the coupling structure and the parts to be coupled, that is to say the two signal lines to be connected, a special frequency band or pass band is obtained for the transmission link between the two signal lines. This can be respectively determined by what is known as a transfer function. This pass band is therefore a characteristic property of the respectively chosen configuration of the coupling device.

On the other hand, the data signals are provided with what is known as a special coding, which works in a defined frequency band. During operation, that is to say during the transmission of the high-frequency data signal from the one signal line into the other signal line, the coding is then chosen, or possibly also adapted, in such a way that the frequency band of the coding is made to match the pass band of the transmission link. If required, in an expedient development in this respect, a recoding is performed. In particular in the area of galvanically coupled elements, coding known as NRZ (non return to zero) is customary. For the intended application, however, this often tends to be found to be unsuitable, in particular on account of the great low-frequency component. The Manchester coding and also the 86106 coding, for example, have been found here to be better suited. These convert the NRZ coding to a certain extent into a coding that is adapted to the frequency range of the pass band. Alternatively, the adaptation of the signal spectrum to the pass band can also take place by methods of digital modulation.

With identical data to be transmitted, the frequency ranges lie in different frequency windows according to the coding.

Other features which are considered as characteristic for the invention are set forth in the appended claims.

Although the invention is illustrated and described herein as embodied in a coupling device for the contact-free transmission of data signals and a method for the transmission of data signals, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIGS. 7A-7D are a side view (FIG. 7A), a plan view (FIG. 7B), a first sectional view (FIG. 7C) taken along sectional line VIIC-VIIC in FIG. 7A and a second sectional view (FIG. 7D) taken along sectional line VIID-VIID in FIG. 7B of a sixth variant of an embodiment;

DETAILED DESCRIPTION OF THE INVENTION

In the figures, parts that have the same effect are respectively provided with the same designations. FIGS. 2 to 5 show variants given by way of example of possible coupling structures, no coupling aids being represented in these figures for the sake of simplicity. These are represented by way of example in FIGS. 6 and 7 and can also be transferred to the variants that are represented in the other figures.

Figure 1:
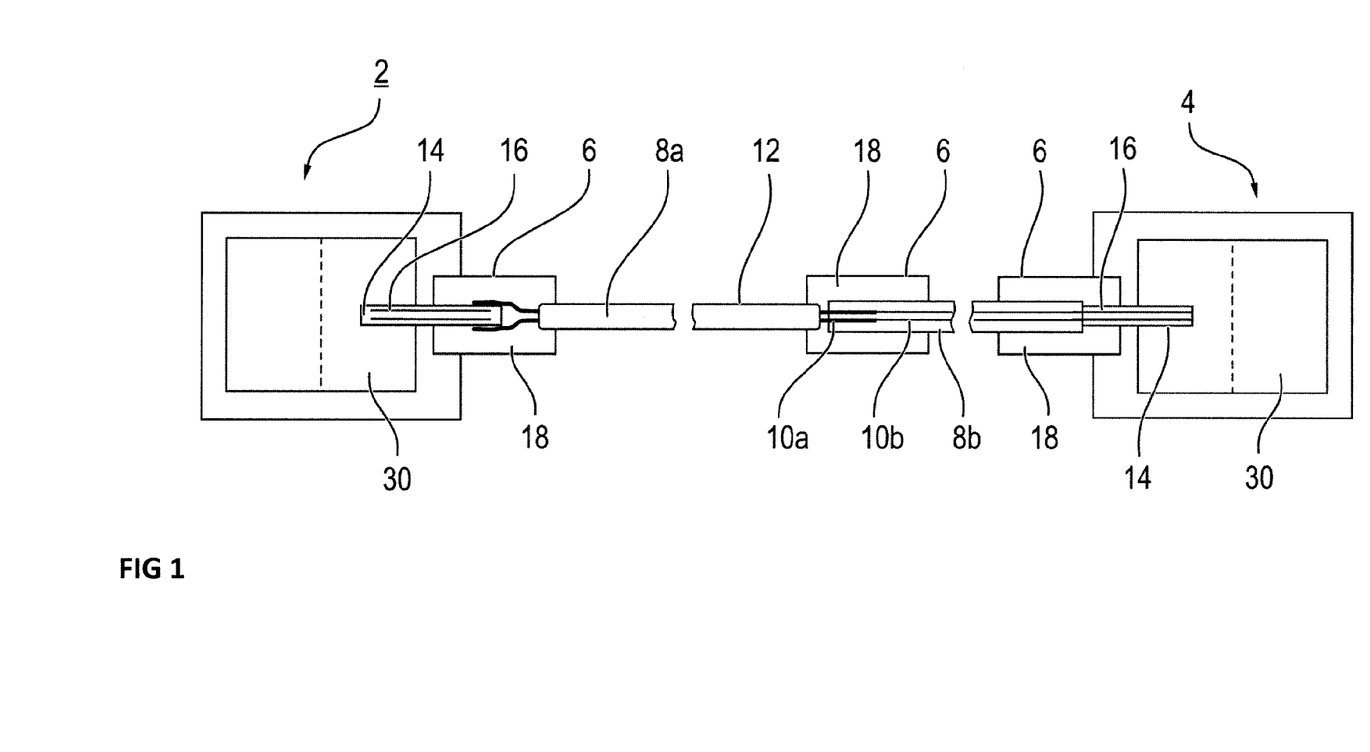
FIG. 1 is an illustration of a data transmission link by way of example, with multiple coupling devices according to the invention.

To illustrate the basic concept, represented in FIG. 1 is a transmission link for a signal transmission of a high-frequency data signal from a transmitter 2 to a receiver 4. By way of example, different coupling devices 6 are illustrated here. The data signals to be transmitted may be individual, earth-based signals (single-ended, common mode or in coaxial mode) or else a differential signal (mixed mode, normal mode), which has two signal-carrying cores. In principle, any other desired arrangements are also possible, such as for example common-mode arrangements using multi-core forms.

The transmitter 2 and the receiver 4 are connected to one another by way of multiple cable portions of signal cables 8. The one cable portion is formed in the exemplary embodiment by a conventional round cable or sheathed line 8a, which has multiple signal cores 10a that are insulated and surrounded by a common cable sheath 12. The second signal cable is preferably formed by an extruded flat cable 8b, which usually has as a signal core 10b flat-rolled (copper) wires, which are embedded in an insulation. The signal cables 8a, 8b are coupled to one another and respectively to the transmitter 2 or the receiver 4 by way of a respective coupling device 6 for the data transmission. As far as the transmitter 2 and the receiver 4 are concerned, in the exemplary embodiment a printed circuit board 14 with conductor tracks 16 provided on it is arranged. The coupling devices 6 are respectively used for contact-free signal in coupling between the signal cores 10a, 10b or conductor tracks 16 corresponding to one another. The coupling devices 6 respectively have here a housing 18, into which the parts to be coupled have respectively been inserted and in which the individual signal cores 10a, 10b or the conductor tracks 16 are held in relation to one another in a defined way with the aid of a coupling structure 20 (see in this respect FIGS. 2 to 7).

Various variants of an embodiment of the coupling devices 6 are represented in FIGS. 2 to 7.

In the coupling devices 6, coupling portions 22 of the various signal cores 10a, 10b or conductor tracks 16 are respectively arranged in relation to one another in a defined manner, but free from contact and without the use of galvanically coupled coupling elements. This is at the same time also an essential basic concept of the present coupling system, which is that of dispensing with any elements that are galvanically attached to the ends of the signal cables. Consequently, no crimp-soldering or other connecting processes have to be performed to form the coupling device. Therefore, no special prefabrication is required. Rather, the ends of the signal cores 10a, 10b are merely arranged parallel to one another.

Figure 2A:
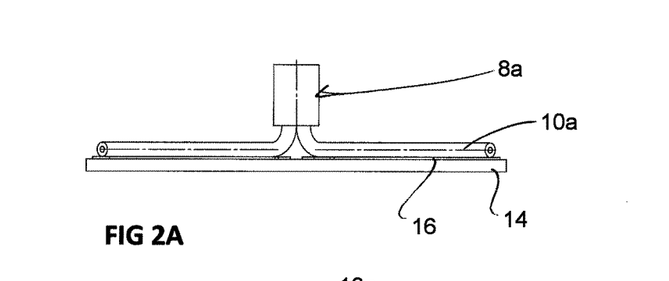
FIGS. 2A-2C are a side view (FIG. 2A), a plan view (FIG. 2B) and a sectional view (FIG. 2C) taken along the sectional line IIC-IIC in FIG. 2B of a coupling device according to a first variant.
Figure 2B:
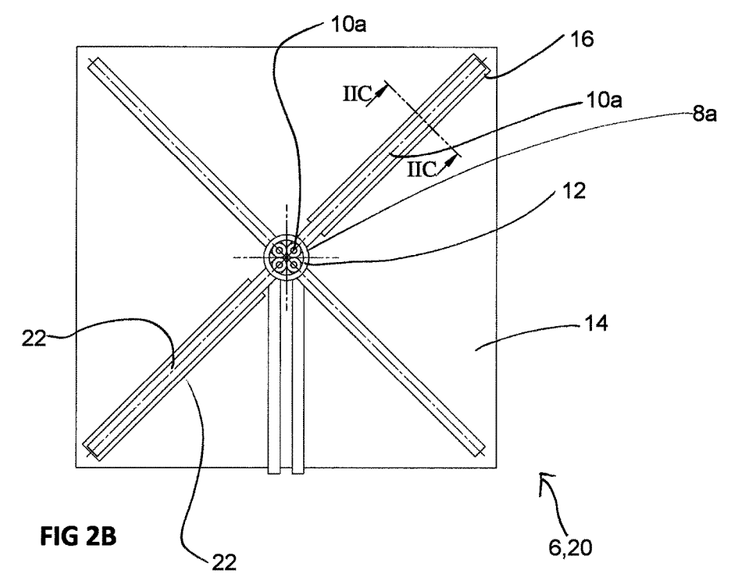
Figure 2C:
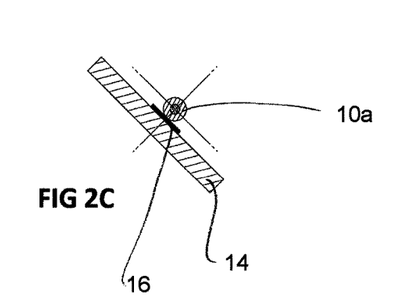

In the case of the variant of an embodiment of FIGS. 2A to 2C, the sheathed line 8a, which has signal cores 10a that are stranded together in the manner of a quad stranding and are surrounded by the cable sheath 12, is used as the signal line. The individual signal cores 10a protrude with their coupling portion 22 out of the cable sheath 12 and are then deflected by approximately 90° and distributed for instance in the form of a cross or star within a coupling plane. In a way corresponding thereto, arranged on a carrier structure, for example a printed circuit board 14, are at least two signal conductors, which are formed for example as conductor tracks 16 and are oriented 180° diametrically in relation to one another in their coupling portions 22. The second pair of cores may be coupled in a comparable way. The conductor tracks 16 are led out centrally from the center of the sheathed line 8a.

The coupling structure 20 is a mechanical holding element, which is not represented any more specifically here and in which the printed circuit board 14 and the individual conductor cores 10a are held in a defined relative position in relation to one another.

Figure 3A:
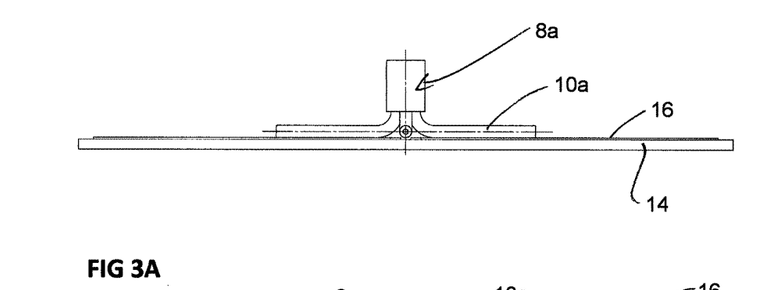
FIGS. 3A-3C are a side view (FIG. 3A), a plan view (FIG. 3B) and a sectional view (FIG. 3C) taken along the sectional line IIIC-IIIC in FIG. 3B of a coupling device according to a second variant.
Figure 3B:
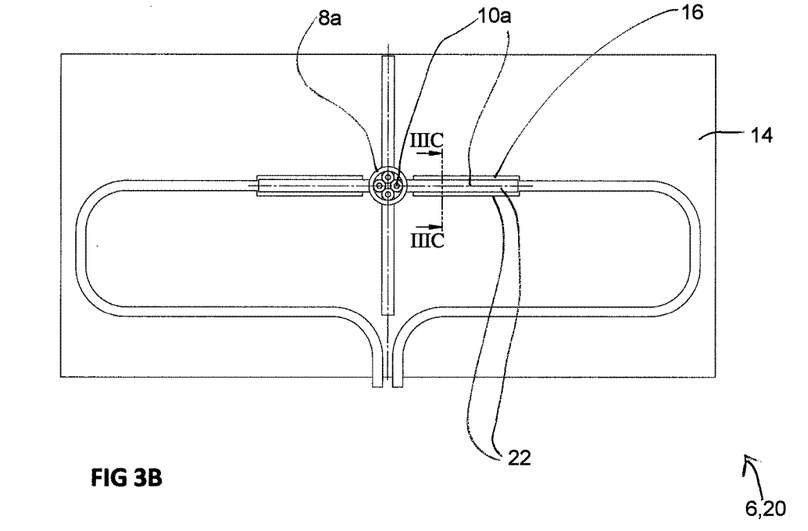
Figure 3C:
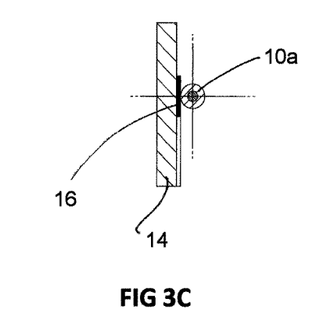
Figure 4A:
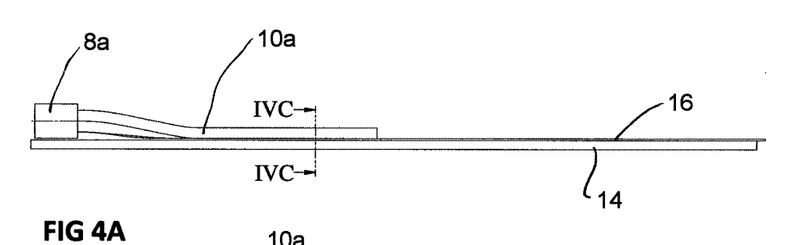
FIGS. 4A-4D are a side view (FIG. 4A), a plan view (FIG. 4B), a first sectional view (FIG. 4C) taken along the sectional line IVC-IVC in FIG. 4A and a second sectional view (FIG. 4D) taken along the sectional line IVD-IVD in FIG. 4B of a coupling device according to a third variant.
Figure 4B:
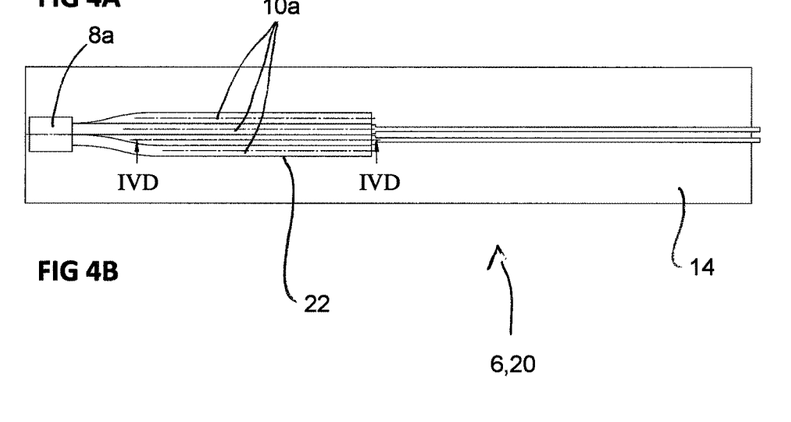
Figure 4C:
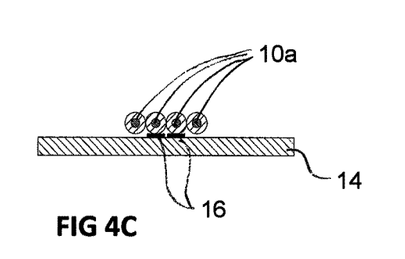
Figure 4D:
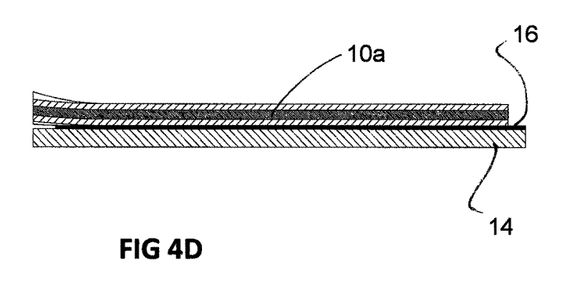
Figure 5A:
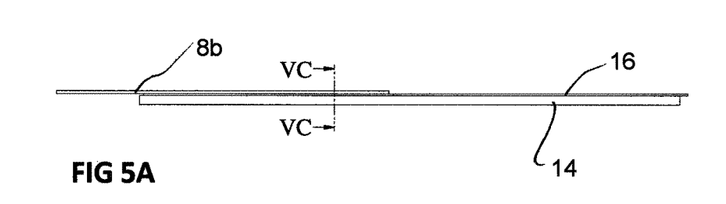
FIGS. 5A-5D are a side view (FIG. 5A), a plan view (FIG. 5B), a first sectional view (FIG. 5C) taken along the sectional line VC-VC in FIG. 5A and a second sectional view (FIG. 5D) taken along the sectional line VD-VD in FIG. 5B of a coupling device according to a fourth variant of an embodiment.
Figure 5B:
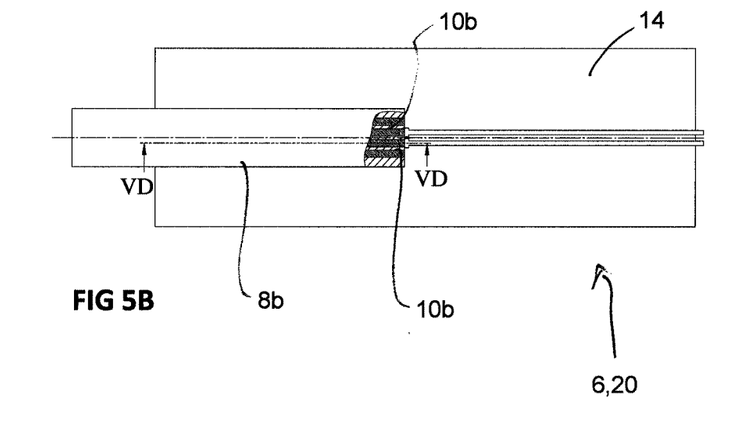
Figure 5C:
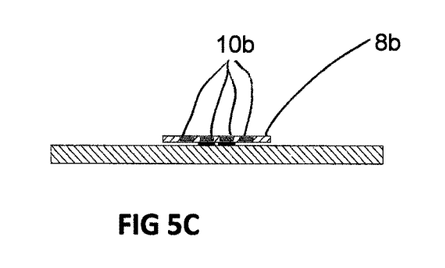
Figure 5D:
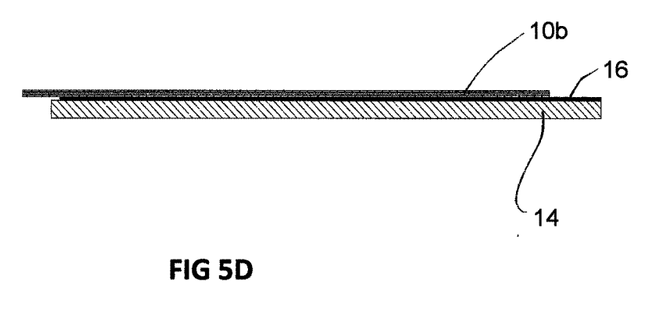
Figure 6A:
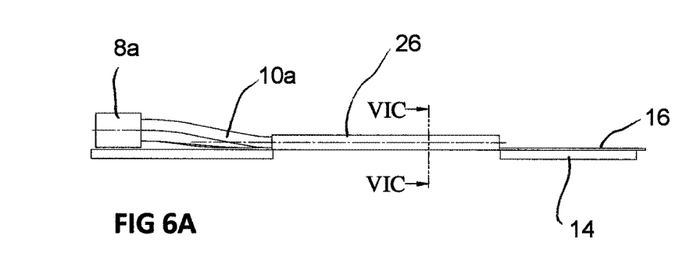
FIGS. 6A-6D are a side view (FIG. 6A), a plan view (FIG. 6B), a first sectional view (FIG. 6C) taken along the sectional line VIC-VIC in FIG. 6A and a second sectional view (FIG. 6D) taken along the sectional line VID-VID in FIG. 6B of a fifth variant of an embodiment.
Figure 6B:
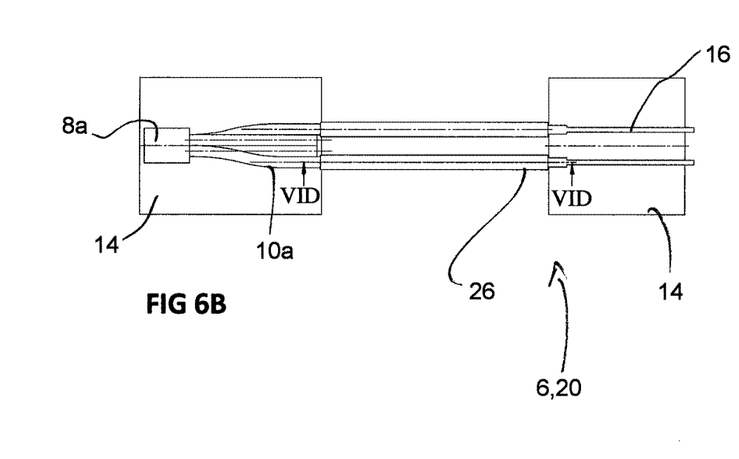
Figure 6C:
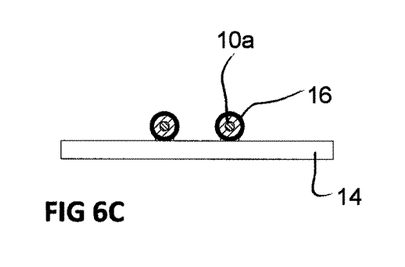
Figure 6D:
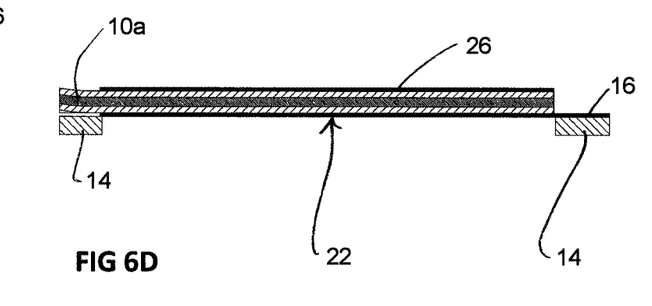
Figure 7A:
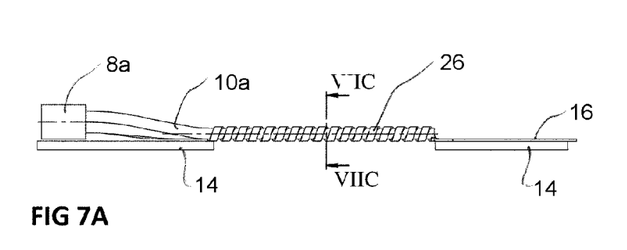
Figure 7B:
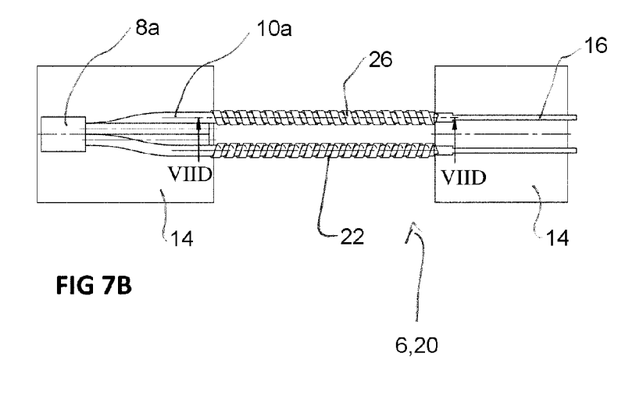
Figure 7C:
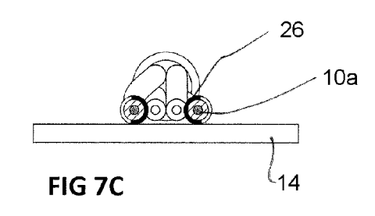

The variant of an embodiment of FIGS. 3A to 3C is similar to that according to FIGS. 2A to 2C. The signal cores 10a of the signal cable 8a are in turn arranged in the form of a star. However—as a difference from the variant according to FIGS. 2A-2C—the conductor tracks 16 are led away to the outside from the center of the sheathed line 8a and only subsequently brought together again.

Finally, FIGS. 4A to 4D show a coupling of the signal cable 8a to conductor tracks 16, the signal cores 10a being brought into a common coupling plane with the aid of the coupling structure (not represented any more specifically) in the region of their coupling portions 22 and placed onto the printed circuit board 14.

In a similar way, according to FIGS. 5A to 5D, the coupling of a printed circuit board 14 to a flat cable 8b is represented. Here, too, the signal cores 10b and conductor tracks 16 corresponding to one another are made to overlap. The individual parts to be coupled are fixed here in a defined position in relation to one another by the coupling structure 20, which is not represented any more specifically here in the figures.

Respectively represented in the exemplary embodiments of FIGS. 6A to 6D and FIGS. 7A to 7D is a coupling aid 26, which serves for the coupling of signal conductors 10a to conductor tracks 16. The coupling aid 26 is generally an element in the form of a socket or tube, into which a signal core of the respective signal conductor 10a has been inserted, in particular individually. In the exemplary embodiment of FIGS. 6A-6D, the coupling aid 26 is formed as a sleeve and in the exemplary embodiment of FIGS. 7A-7D it is formed as a helix. This is in each case an electrically conductive formation, in particular of metal, which are respectively electrically connected to the conductor tracks 16. This may take place for example by a soldering operation. In the two exemplary embodiments, the coupling aid 26 in this case protrudes beyond one end of the printed circuit board 14, i.e. it is merely fastened by an end piece on the printed circuit board 14, for example soldered on. Alternatively, the coupling aid 26 is fastened in large part or completely on the printed circuit board 14.

The coupling portions 22 of the signal cable 8a have been inserted into these coupling aids 26 in an easy way. The coupling aids 26 therefore define to this extent coupling portions 22 of the further signal line. These coupling aids 26 are used to achieve improved in coupling of the data signals.

For simplified insertion of the end portions (coupling portions 22) of the signal cable 8a, the respective coupling aid 26 preferably has at the end an opening that is widened for example in the manner of a trumpet or conically.

Figure 8:
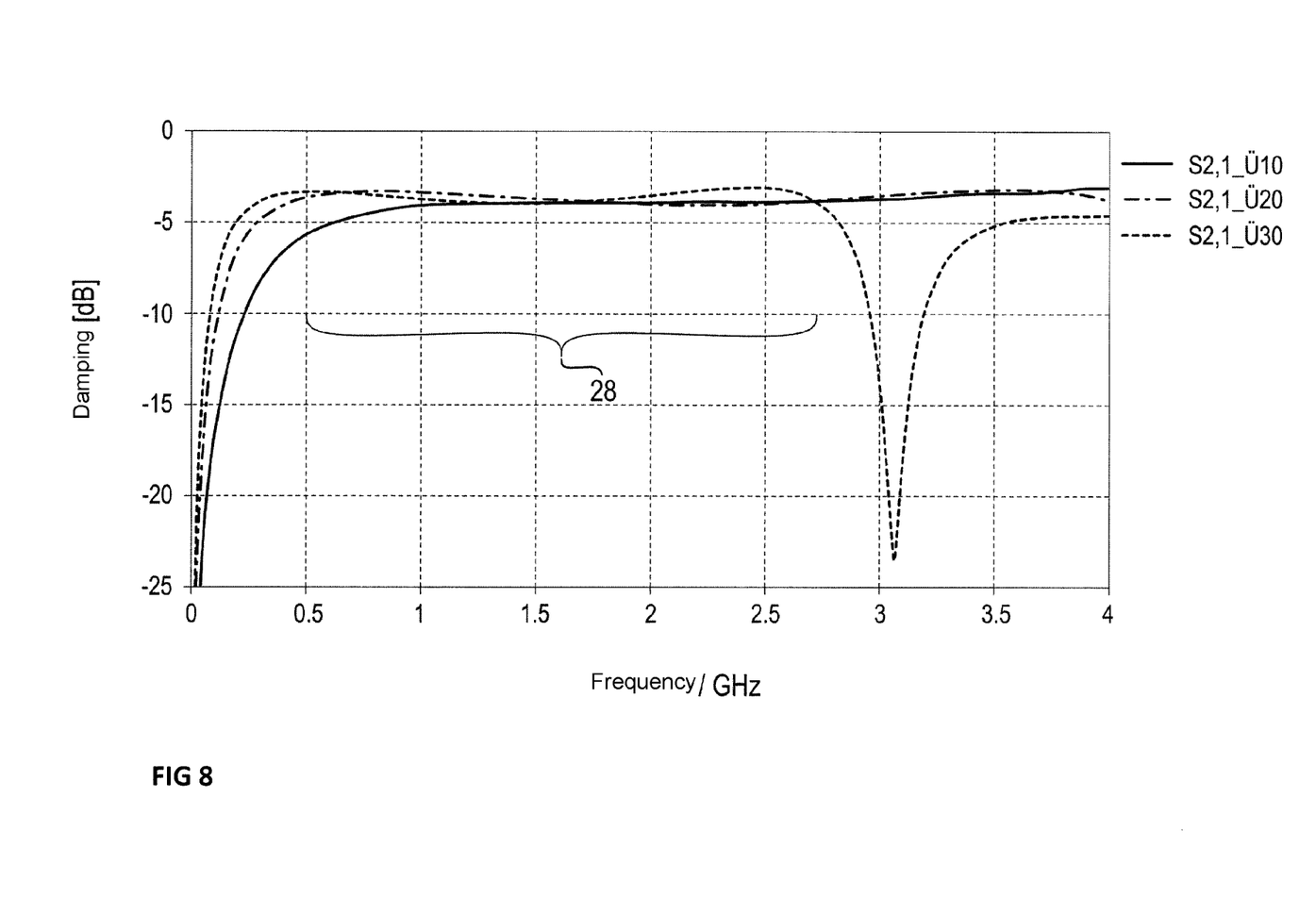
FIG. 8 is a graph showing a profile of a damping value with respect to the frequency of a transmission link by way of a coupling device.

FIG. 8 finally shows by way of example the profile of a damping with respect to the frequency of the transmission link between two signal conductors 10a, 10b, 16 connected to one another by way of a respective coupling device 6. As can be seen from this, a transmission is only possible in a defined frequency range, that known as the pass band 28. In the case of the exemplary embodiment, this lies in the range from 0.5 GHz to approximately 2.7 GHz.

Expediently used for the transmission of the data signal is a coding of which the frequency range coincides at least largely with the pass band 28.

Thus, for example, the frequency band of a coding known as NRZ of an LVDS data signal (low voltage digital signaling) usually lies in a frequency band of up to approximately 0.5 GHz. A transmission of an NRZ-coded LVDS data signal would therefore not be possible, or only be possible with significant losses. Therefore, a suitable coding is expediently performed, for example that known as the Manchester coding, which, with an identical LVDS data signal, shows a frequency band in the range from approximately 0.5 to 1.8 GHz. The transmitter 2 and the receiver 4 (see in this respect FIG. 1) therefore preferably also have a communication unit 30, by way of which the data signals to be transmitted are prepared by the corresponding coding. If, for example, the transmitter is already receiving NRZ-coded data for further transmission, the communication unit 30 is also designed to perform if need be a recoding into a suitable coding, for example from the NRZ coding into the Manchester coding.

The exemplary embodiments have been explained in conjunction with a coupling of a signal cable 10a, 10b to a printed circuit board 14 as a further signal line, but is not restricted to this. In principle, with the coupling system described here, data transmissions are possible between two signal cables or between two signal cables with aids (similar to FIGS. 6A to 7D) or between two signal paths that are fixedly connected to mechanical components. The signal paths may be cable structures or else other signal conductors such as for example conductor tracks. In principle, the coupling device as such may also be galvanically connected to the signal lines.

Figure 9A:
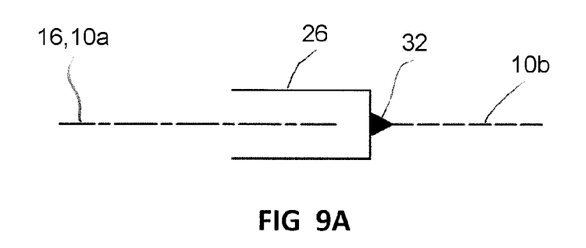
FIGS. 9A-9D are greatly simplified basic diagrams of different coupling variants.
Figure 9B:
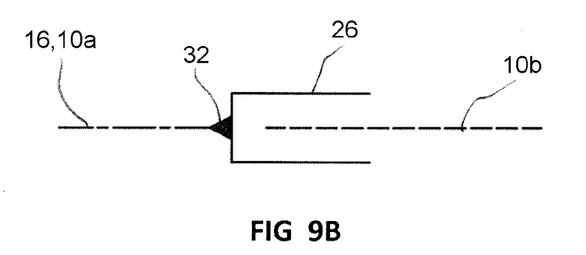
Figure 9C:
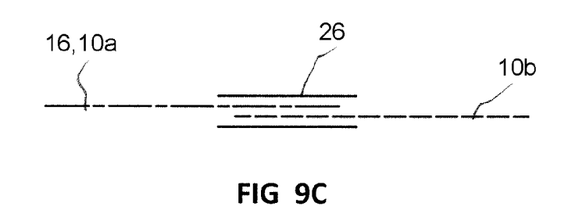

FIGS. 9A to 9D show greatly simplified basic representations of different coupling variants. In the case of FIGS. 9A to 9C, coupling respectively takes place between a first part to be coupled that is represented on the left and a second part to be coupled that is represented on the right, by way of a respective coupling aid 26. The part to be coupled on the left is in this case for example a conductor track 16 of a printed circuit board 14 or else a signal core 10a of a data cable, for example a signal cable 8a or a flat cable 8b. The part to be coupled on the right is respectively a signal conductor 10b of a data cable, for example a signal cable 8a or a flat cable 8b. In principle, other cable variants may also be provided.

In the case of the variants of an embodiment of FIGS. 9A and 9B, the coupling element 26 is respectively connected galvanically to one of the parts to be coupled in an electrically contacting manner by way of a contact point 32. The coupling aid 26 is then used for the contactless inductive or capacitive coupling to the second part to be coupled. As a difference from this, in the case of the variant of an embodiment of FIG. 9C, the coupling aid 26 is not galvanically connected to either of the two parts to be coupled and surrounds the coupling section for example in the form of a sleeve or spiral.

Figure 9D:
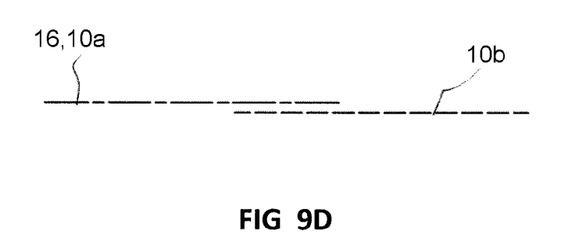

Finally, in the case of the variant of an embodiment of FIG. 9D, a direct coupling between the two signal conductors 10a, 10b, 16 without a coupling aid 26 and without any galvanic contacting is represented. The part to be coupled on the left is in this case once again optionally a printed circuit board 14 with a conductor track 16 provided on it or a signal core 10b of a data cable.

The alternatives represented in the individual FIGS. 2-9 preferably define in each case variants for a plug-in connection, the two parts to be plugged in respectively having one of the two signal conductors 10a, 10b, 16 to be coupled to one another. Therefore, integrated within a respective connector housing are the structures shown in FIGS. 2 to 9, a separation preferably taking place respectively at the coupling aid, which is arranged in the one connector part and into which the one or more signal cores (signal conductors 10a, 10b) of the other signal line 8a, 8b can be loosely inserted, in order in this way to achieve the desired contactless coupling in the case of a plug-in connection.

The following is a summary list of reference numerals and the corresponding structure used in the above description of the invention:

2 transmitter
4 receiver
6 coupling device
8a signal cable
10a signal core
8b flat cable
10b signal core
12 cable sheath
14 printed circuit board
16 conductor track
18 housing
20 coupling structure
22 coupling portion
26 coupling aid
28 passband
30 communication unit
32 contact point

The invention claimed is:

1. A coupling device for a contact-free transmission of data signals between two signal cables each having at least one signal conductor, at least one of the two signal conductors being a signal core being free from galvanically connected coupling elements, the coupling device comprising:
a coupling structure, via said coupling structure coupling portions of the two signal conductors are positioned parallel to one another, the two signal conductors including a first signal conductor and a second signal conductor; and
said coupling structure having a coupling aid in which a coupling portion of one of the signal conductors is accommodated, said coupling structure allowing a transfer of the data signals from the first signal conductor to the second signal conductor in a contact free manner where the first signal conductor and the second signal conductor do not touch each other.

2. The coupling device according to claim 1, further comprising a housing of a connector, said coupling structure is integrated in said housing by way of which the two signal conductors are connected to one another in a contact-free manner.

3. The coupling device according to claim 1, wherein said coupling aid is configured for influencing a coupling.

4. The coupling device according to claim 1, wherein said coupling aid is formed from a conducting material.

5. The coupling device according to claim 1, wherein said coupling aid is configured in a form of a socket for receiving the coupling portion.

6. The coupling device according to claim 1, wherein said coupling aid is formed by a helix or a sleeve.

7. The coupling device according to claim 1, further comprising an integrated filtering element or damping element for an undisturbed signal transmission.

8. The coupling device according to claim 1, wherein said coupling device is used for data signals that have a coding of which a frequency band lies within a passband of said coupling structure.

9. A method for signal transmission between two signal cables, which comprises the steps of:
providing a coupling device according to claim 1; and
transmitting signals between the two signal cables using the coupling device.

10. A coupling assembly for a contact-free transmission of data signals, the coupling assembly comprising;
two signal cables each having at least one signal conductor, at least one of said signal conductors being a signal core of one of said signal cables and being free from galvanically connected coupling elements, said two signal conductors having coupling portions; and
a coupling structure having a coupling aid in which a coupling portion of one of said signal conductors is accommodated, and via said coupling structure, said coupling portions of said two signal conductors are positioned parallel to one another, said coupling structure allowing a transfer of the data signals from a first of said two signal cables to a second of said two signal cables in a contact free manner where said first signal cable and said second signal cable do not touch each other.

11. The coupling assembly according to claim 10, wherein one of said two signal conductors is a conductor track on a printed circuit board.

12. The coupling assembly according to claim 11, wherein said coupling aid is connected to said conductor track in an electrically conducting manner.

13. The coupling assembly according to claim 11, wherein said coupling aid is fastened on said printed circuit board and protrudes beyond a free end of said printed circuit board.

14. The coupling assembly according to claim 10, wherein said coupling portion of at least one of said signal conductors is formed by an end portion of said one signal conductor.

15. The coupling assembly according to claim 10, wherein each of said signal cables is of a multi-core form, containing multiple signal cores, which are kept spaced apart from one another by said coupling structure in a defined geometry, said signal conductors of a second one of said signal cables is oriented in a same geometry in a way corresponding thereto.

16. The coupling assembly according to claim 10, wherein said coupling portions of said signal conductors are oriented at an angle in relation to a longitudinal direction of a respective one of said signal cables.

17. The coupling assembly according to claim 10, wherein said signal core is a doubly insulated round core.

18. The coupling device according to claim 10, wherein said coupling portions of said signal conductors are formed by an end portion of said signal conductors.

* * * * *